(No Model.) 2 Sheets—Sheet 1.
J. W. FLEETWOOD.
FILTER.
No. 566,391. Patented Aug. 25, 1896.
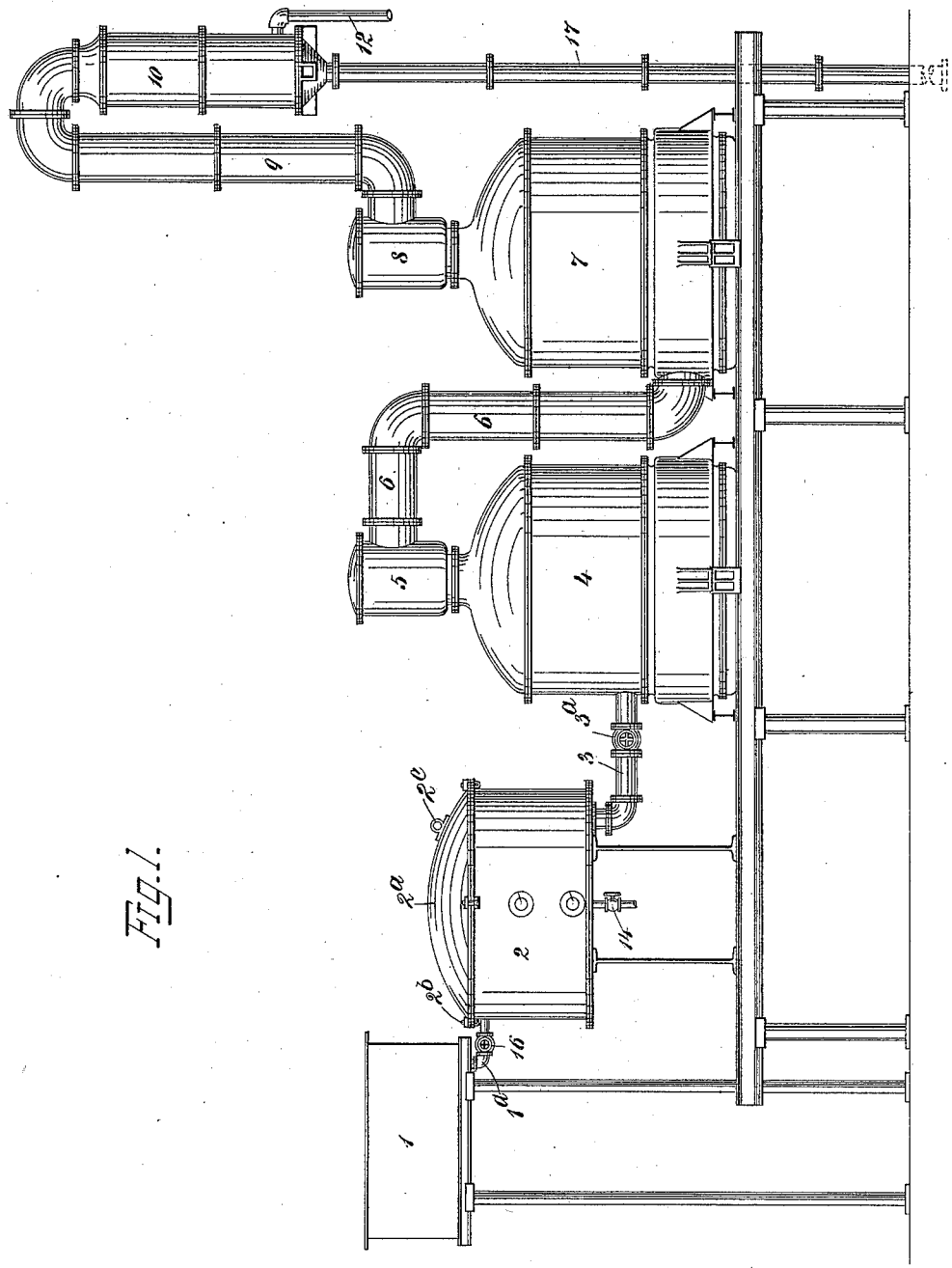
WITNESSES:
Henry Grabau
J. C. Wilson
INVENTOR
John W. Fleetwood
BY
Whitman & Wilkinson
ATTORNEYS.

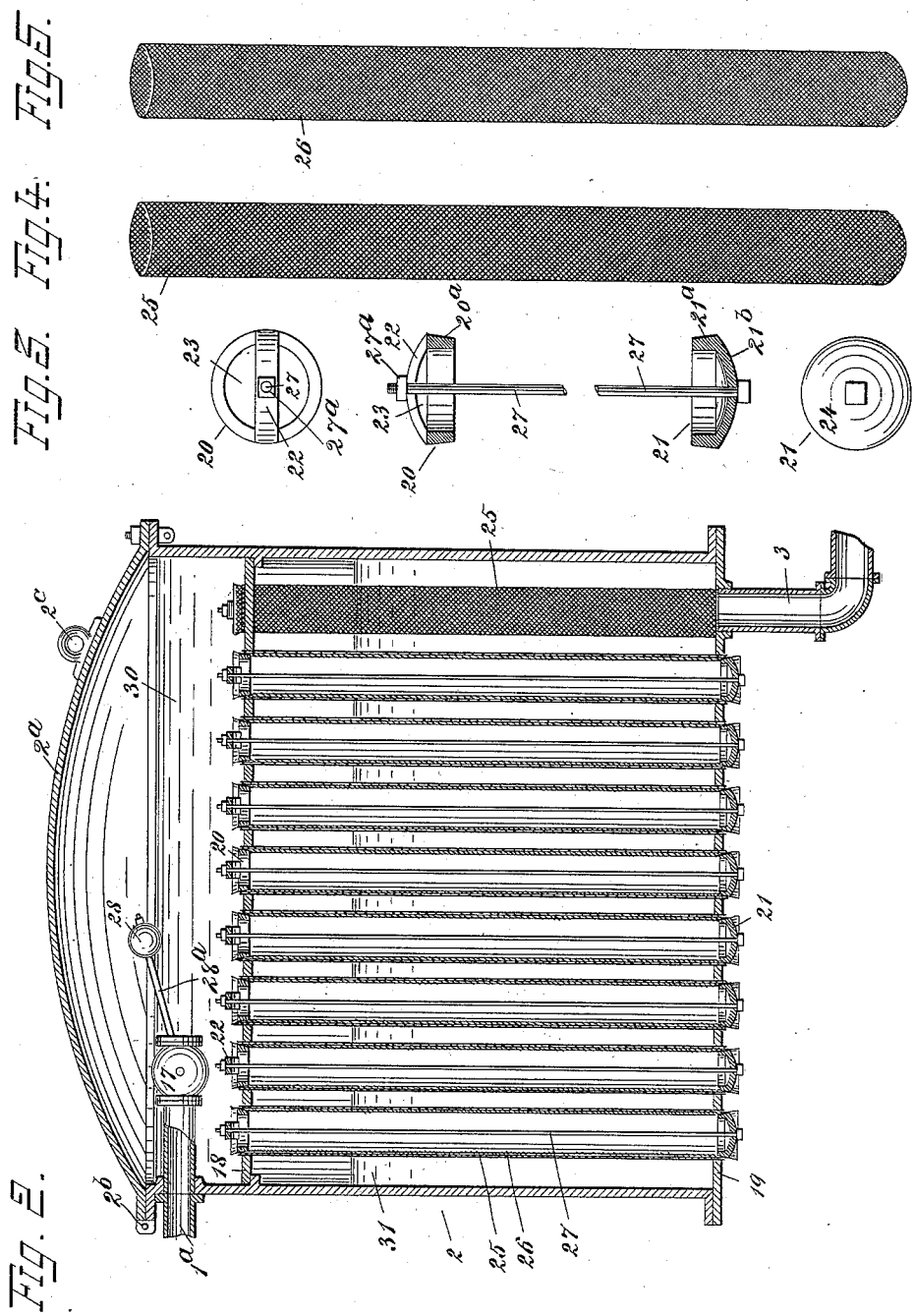

UNITED STATES PATENT OFFICE.

JOHN WESLEY FLEETWOOD, OF NEW ORLEANS, LOUISIANA.

FILTER.

SPECIFICATION forming part of Letters Patent No. 566,391, dated August 25, 1896.

Application filed September 26, 1895. Serial No. 563,772. (No model.)

*To all whom it may concern:*

Be it known that I, JOHN WESLEY FLEETWOOD, a citizen of the United States, residing at New Orleans, in the parish of Orleans and State of Louisiana, have invented certain new and useful Improvements in Filters; and I do hereby declare the following to be a full, clear, and exact description of the invention, such as will enable others skilled in the art to which it appertains to make and use the same.

My invention relates to improvements in filters, and is especially intended to provide for certain improvements in filters used in the manufacture or refining of sugar. In such apparatus the filter-bags have to be frequently changed for purposes of cleaning, and rot very rapidly, owing to the acids in the juice or syrup being filtered and to the acids rapidly formed upon the fermentation of this juice or syrup. Hence it becomes important to provide a filter in which the filter-bags may be readily and rapidly changed, and in which the common accidents due to the rotting of the bags and the consequent mixing of the filtered and the unfiltered material may be avoided. For this purpose I have designed the hereinafter-described apparatus, which will be understood by reference to the accompanying drawings.

Figure 1 represents a side elevation of that arrangement of vacuum-pans known as the "double effect," with the filter connected to the first vacuum-pan and discharging the filtered material thereinto. Fig. 2 represents a vertical section through the filter shown in side elevation in Fig. 1. Fig. 3 represents the details of the two heads for holding the filter-bags in place and the tie-bolt for holding the heads together and in position. Fig. 4 represents a side elevation of the cylindrical wire screen open at both ends and furnishing a support against bursting pressure on the filter-bag; and Fig. 5 represents a perspective view of the filter-bag, which is in the from of an open-ended cylinder when distended with fluid.

Similar numerals refer to corresponding parts throughout the several views.

1 represents a juice or syrup tank containing the fluid to be filtered, which is connected by means of the pipe 1$^a$ to the filter 2. This filter consists of a shell, preferably cylindrical in section and provided with a cover 2$^a$, hinged at one side, as at 2$^b$, and provided with an eye 2$^c$, into which a tackle is hooked and the cover lifted when it is desired to clean out the filter or to replace any or all of the bags. This shell is provided with a perforated bottom plate 19 and a perforated plate 18 near the top thereof, into which plates the filter-bags and connections are secured by water-tight joints, as will be hereinafter described. Extending between these perforations are the wire cylinders 25, inside of which are placed the filter-bags 26, while the two ends are closed by the heads 20 and 21, made tapering, as shown at 20$^a$ and 21$^a$. The bottom head 21 is closed at the bottom, as at 21$^b$, while the top head 20 is provided with a transverse rib 22, and is open interiorly, as at 23. This rib 22 and also the bottom of the lower head are perforated to receive the tie-bolt 27, which is set up by means of the nut 27$^a$, and thus the two heads are wedged into their corresponding apertures, forming a tight joint.

17 represents a float-valve, preferably of the butterfly pattern, which is provided with a float 28 at the end of the arm 28$^a$. As the liquid 30 which enters through the pipe 1$^a$ rises above the plate 18 it lifts this float and cuts off the supply of the incoming liquid, and as soon as the liquid falls above the plate 18 this float falls and allows the liquid to flow in again, and thus the liquid supply or feed regulates itself automatically. This liquid 30 above the plate 18 is in the unfiltered condition, and flowing down through the openings 23 in the upper heads 20 it distends the filter-bags against the wire cylinders 25, and the liquid filters through, attaining a level such as indicated by 31. The filtered liquid is drawn off through the pipe 3, controlled by the valve 3$^a$, into the vacuum-pan 4, whose vapor is conducted through the dome 5 and pipes 6 to the heating-coils of the vacuum-pan 7, whose vapor is carried through the dome 8 and pipe 9 to the condenser 10, which is supplied with water by the pipe 12, and the water of condensation, together with the water for condensing purposes, is drawn off through the pipe 17.

The atmospheric pressure on the top of the liquid 30 and the vacuum in the pan 4 will cause the liquid to filter rapidly through the filter-bags, and thus more rapid work with the apparatus can be obtained; but it will be obvious that the apparatus will operate as a gravity-filter if no such connection is made with the vacuum-pan. While I have shown the various parts as delivering the fluid by gravity or by atmospheric pressure, it will be obvious that the fluid may be pumped from the tank 1 to the filter, and from the filter to the vacuum-pan, or to any other desired point, if it be preferred or more convenient to use pumps.

In order to remove any one or more of the filter-bags and substitute others, the supply of unfiltered liquid is cut off by the valve 16, and the liquid 30 above the plate 18 is allowed to filter through the said bags until the level of the unfiltered liquid is very low in the said bags. In the meantime the filtered liquid 31 is drawn off and the valve 3ª closed.

The cover 2ª is swung back on its hinge, or lifted off, and the nuts 27ª are eased up, allowing the bags to be slipped out from under the heads, the bottom head dropping down and the upper head being lifted up slightly for this purpose. If necessary or preferred, the top head may be taken off entirely, but this will rarely be necessary. As soon as the soiled bags are removed the fresh ones are put in place, the heads set up as before, and the apparatus is ready for use again. It will be seen that the filtering may be expedited by forcing air in under pressure beneath the dome-shaped cover 2ª of the filter; also it will be seen that for ordinary purposes this cover may be omitted entirely.

It will be obvious that various modifications of the herein-described apparatus might be made which could be used without departing from the spirit of my invention.

Having thus described my invention, what I claim, and desire to secure by Letters Patent of the United States, is—

1. In a filter, the combination with a chamber provided with a perforated bottom plate, and a perforated plate at some distance above the said bottom, of wire cylinders extending between said perforations, filter-bags inclosed between said cylinders, tapering heads adapted to press said filter-bags outward in said perforations, the lower head being closed and the upper perforated, and tie-bolts adapted to press said heads together, with means for supplying the unfiltered liquid to the top of said chamber, and for drawing off the filtered liquid from the lower portion thereof, substantially as described.

2. In a filter, the combination with a chamber provided with a perforated bottom plate, and a perforated plate at some distance above the said bottom, of wire cylinders extending between said perforations, filter-bags inclosed by said cylinders, tapering heads adapted to press said filter-bags outward in said perforations, the lower head being closed and the upper perforated, tie-bolts adapted to press said heads together, a supply-pipe opening into the upper portion of said filter-chamber, a float-valve controlling the flow of liquid through said pipe, and means for drawing off the filtered fluid from near the base of said chamber, substantially as described.

3. In a filter, the combination with a chamber provided with a perforated bottom plate, and a perforated plate at some distance above the said bottom, of wire cylinders extending between said perforations, filter-bags inclosed by said cylinders, tapering heads adapted to press said filter-bags outward, in said perforations, the lower head being closed and the upper perforated, tie-bolts adapted to press said heads together, means for supplying the unfiltered liquid to the upper portion of said chamber, and for drawing off the filtered liquid from the lower portion thereof, and means for exerting a pressure on the surface of the unfiltered liquid, in the upper portion of said chamber, substantially as described.

In testimony whereof I affix my signature in presence of two witnesses.

JOHN WESLEY FLEETWOOD.

Witnesses:
C. H. HUGHES,
ADAM SCHAAD.